No. 799,739. PATENTED SEPT. 19, 1905.
F. A. LAKE.
BALING PRESS.
APPLICATION FILED MAR. 9, 1905.
5 SHEETS—SHEET 1.
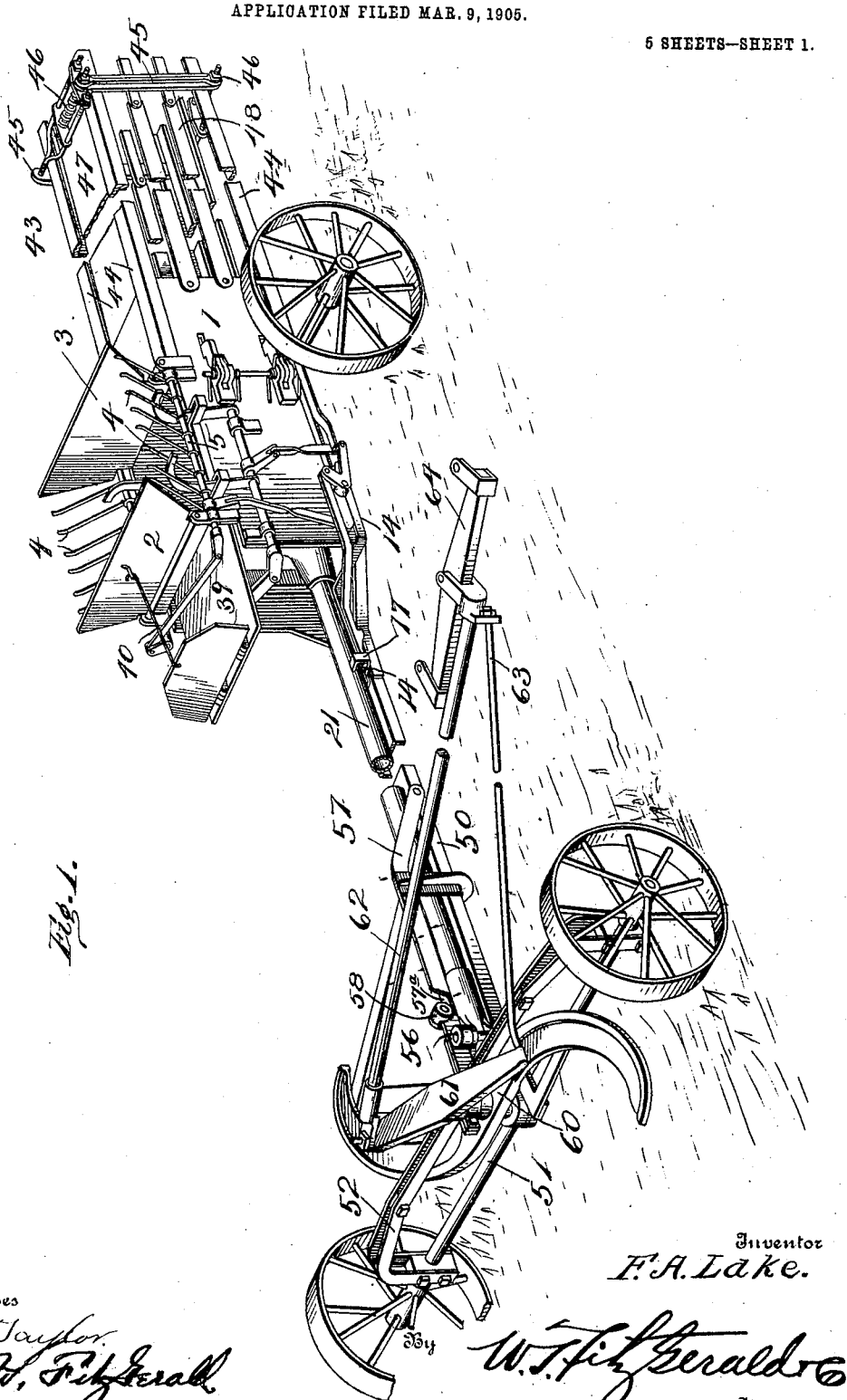

No. 799,739. PATENTED SEPT. 19, 1905.
F. A. LAKE.
BALING PRESS.
APPLICATION FILED MAR. 8, 1905.
5 SHEETS—SHEET 2.
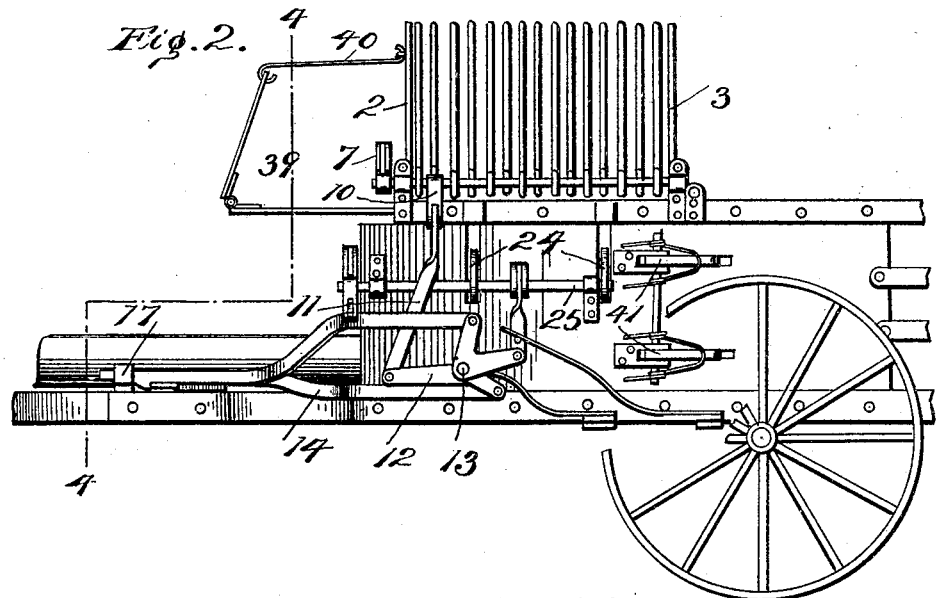
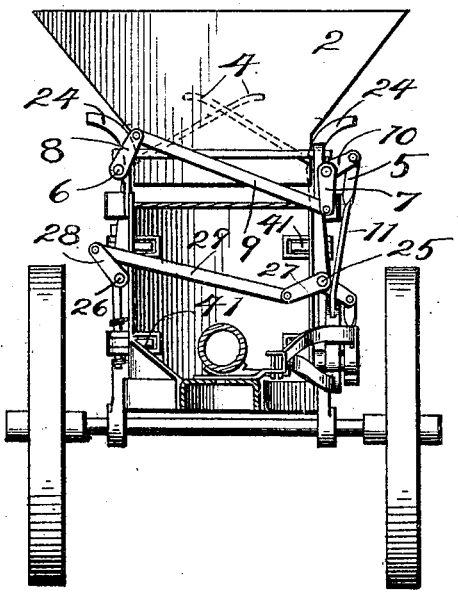
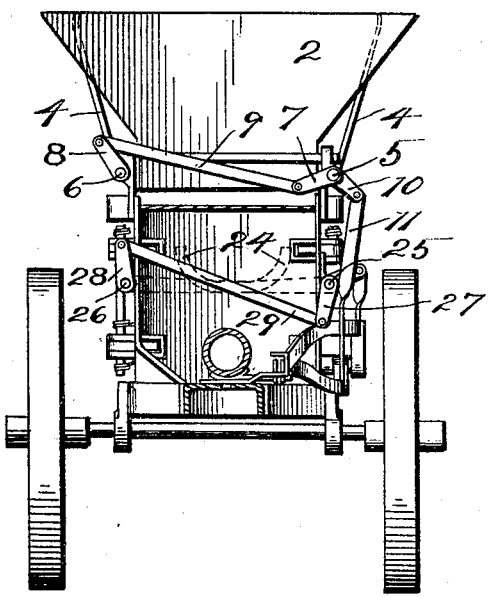
Witnesses
Inventor
F. A. Lake
By W. T. FitzGerald & Co.,
Attorneys

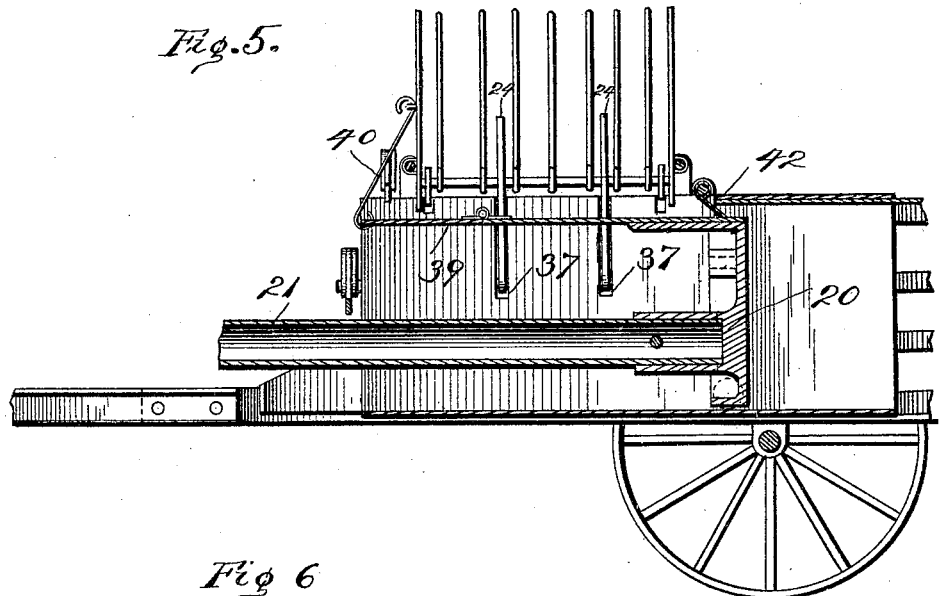
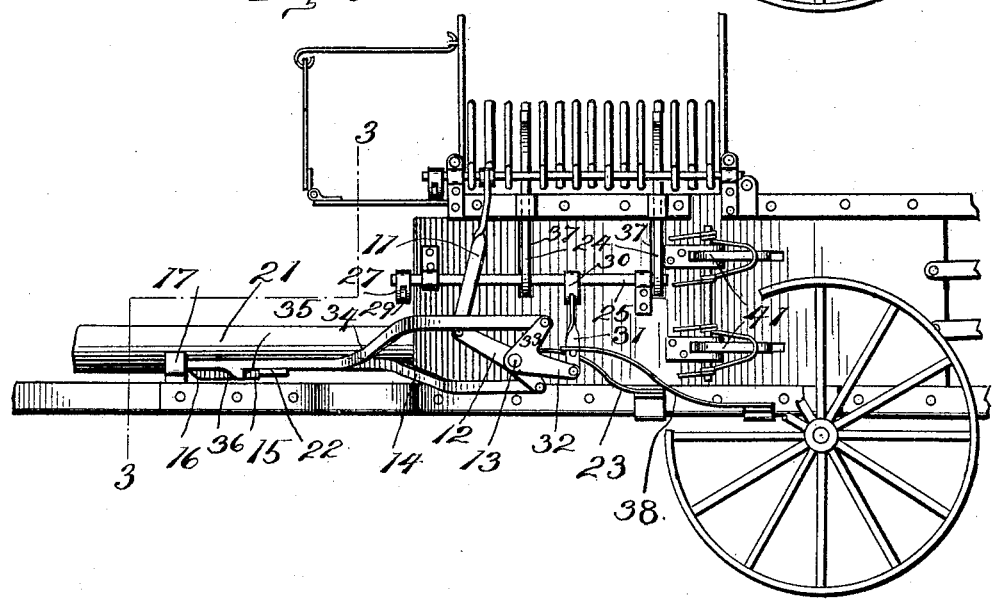

No. 799,739. PATENTED SEPT. 19, 1905.
F. A. LAKE.
BALING PRESS.
APPLICATION FILED MAR. 9, 1905.
5 SHEETS—SHEET 4.
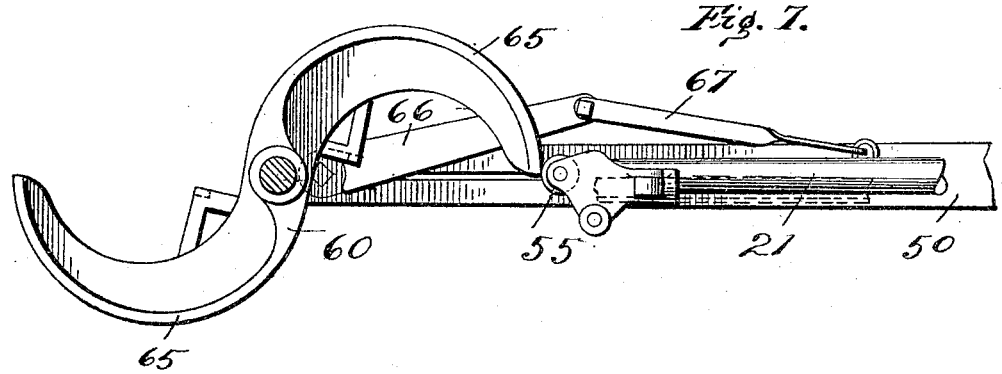
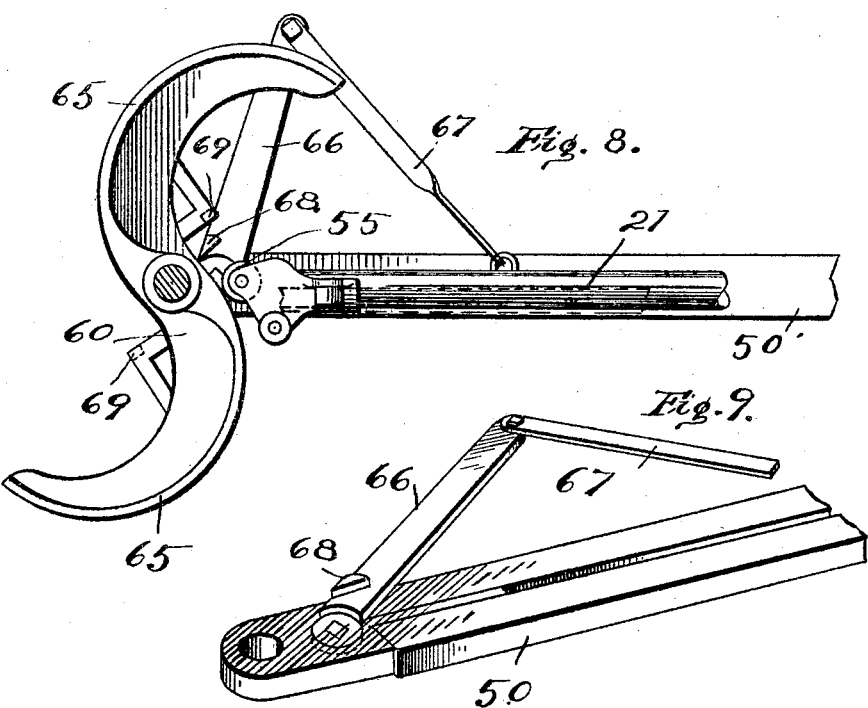
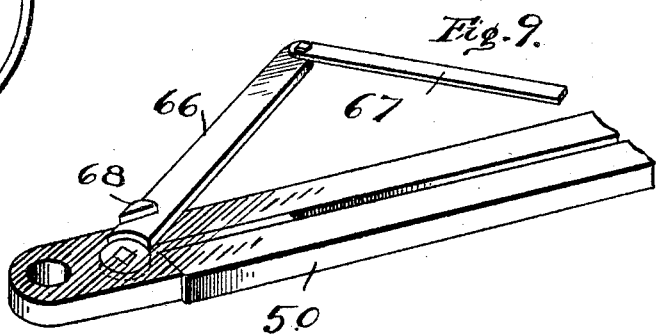
Witnesses
Inventor
F. A. Lake.

No. 799,739. PATENTED SEPT. 19, 1905.
F. A. LAKE.
BALING PRESS.
APPLICATION FILED MAR. 9, 1905.
5 SHEETS—SHEET 5.
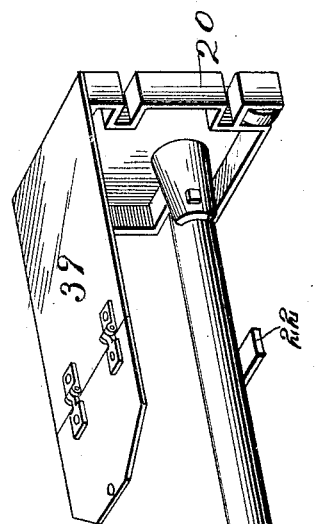
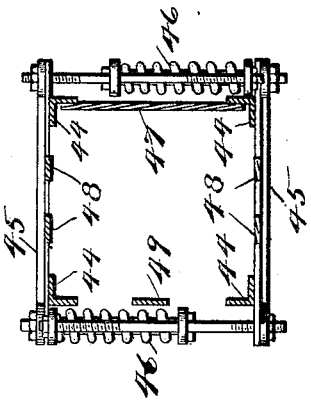
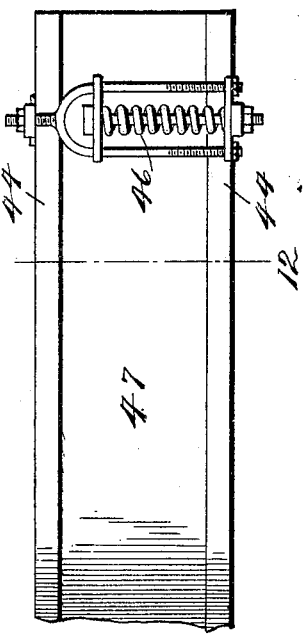
Witnesses
W. R. Taylor
S. W. FitzGerald
Inventor
F. A. Lake.
By W. T. FitzGerald
Attorneys

UNITED STATES PATENT OFFICE.

FRANK A. LAKE, OF CASSOPOLIS, MICHIGAN.

BALING-PRESS.

No. 799,739.　　　Specification of Letters Patent.　　　Patented Sept. 19, 1905.

Application filed March 9, 1905. Serial No. 249,241.

*To all whom it may concern:*

Be it known that I, FRANK A. LAKE, a citizen of the United States, residing at Cassopolis, in the county of Cass and State of Michigan, have invented certain new and useful Improvements in Baling-Presses; and I do hereby declare the following to be a full, clear, and exact description of the invention, such as will enable others skilled in the art to which it appertains to make and use the same.

This invention relates to baling-presses, and particularly to presses in which a reciprocating plunger is employed to compress the material in the bale-chamber.

The invention will be fully described in the following specification, reference being had to the accompanying drawings, in which—

Figure 1 is a perspective view of a baling-press embodying my invention. Fig. 2 is a side elevation of the bale-chamber and the feed mechanism. Fig. 3 is a vertical transverse section on the line 3 3 of Fig. 6. Fig. 4 is a vertical transverse section on the line 4 4 of Fig. 2. Fig. 5 is a vertical longitudinal section through the bale-chamber. Fig. 6 is a view similar to Fig. 2, showing the feed mechanism in a different position. Figs. 7 and 8 are plan views of a double-faced cam and other devices for reciprocating the plunger, the parts being shown in different positions. Fig. 9 is a detached detail. Fig. 10 is a perspective view of the plunger and its pitman. Fig. 11 is a top plan view of the rear portion of the contracting chamber, and Fig. 12 is a sectional view of the same on the line 12 12 of Fig. 11.

That portion of the bale-chamber within which the plunger reciprocates is indicated by 1 and has solid sides and bottom, while the top is provided with an opening forming a feed-throat for the material to be baled. Extending upwardly from the front and rear ends of the opening in the top of the box 1 are two hinged plates 2 and 3, and a series of fingers 4 extend upwardly from the sides, and these plates and fingers form a feed-hopper for the bale-chamber. The fingers on one side are secured to a shaft 5 and on the other side to a shaft 6, both shafts being supported to turn in suitable bearings on the side of the box 1 for a purpose to be hereinafter explained. The shaft 5 is provided with a crank-arm 7 at its end adjacent the plate 2, and the shaft 6 has a crank-arm 8 at the corresponding end, and these arms are connected by a link 9. The crank-arms are so arranged that when the shaft 5 is rocked in one direction the shaft 6 will rock in the opposite direction, thereby causing the opposing sets of fingers 4 to move toward or away from each other. In Fig. 3 these sets of fingers are shown in dotted lines moved inwardly toward each other with their outer ends crossed, and the fingers are moved to this position for the purpose of pressing the material in the hopper down into the bale-chamber. In order to rock the shaft 5, I provide it with another crank-arm 10, which may be connected to it at any point in its length, and this arm 10 is connected by a link 11 to one end of a lever 12, pivoted between its ends on a stud 13, projecting from the side of the bale-chamber. The other end of the lever 12 is connected to a rod 14, which is provided near its forward free end with a shoulder 15. That part of the rod in advance of the shoulder is beveled, as indicated at 16, (see Fig. 6,) and its forward end rests upon a bracket or loop 17, secured to a fixed part of the machine. (See Figs. 1, 2, and 6.)

It is desirable to operate the fingers 4 during the forward or non-compressing movement of the plunger 20, and in order to do this I provide the plunger-pitman 21 with a lug 22, adapted to engage the shoulder 15. When the pitman is moved forward, the lug 22 will engage the shoulder 15 on the rod 14 and pull the latter forward, and thereby move the fingers 4 to the position shown in Fig. 3, dotted lines. As the rod moves forward its inclined or beveled portion 16 will ride up on the bracket or loop 17, and thereby disengage the shoulder 15 from the lug 22, and a spring 23, which acts on the lever 12, will at once return the fingers 4 to normal position. The inward movement of the fingers 4 gathers the hay or straw that may be in the hopper and pushes it partly through the feed-throat into the chamber; but it is necessary to still further press the material down into the chamber, and to accomplish this I provide a second set of fingers, which are indicated by 24. As shown in the drawings, there are two of these fingers 24 on each side of the bale-chamber; but there may be more, if desired. The fingers 24 on one side of the chamber are fixed at their lower ends on a shaft 25 and those on the other side to a shaft 26, these shafts being supported to turn in suitable bearings on the sides of the chamber, and they are connected to turn together by crank-arms 27 and 28 and link 29 in the same manner as shafts 5 and 6. In order to rock these shafts 25 and 26, I provide shaft 25 with another crank-arm 30, which is connected by a link 31 to one arm 32 of a bell-crank lever pivoted on a stud projecting from the side of the chamber, in this case the stud 13, upon which lever 12 is pivoted. The other arm 33 of the bell-crank lever is connected to a rod 34, provided with a shoulder 35 and inclined portion 36, and the forward free end of this rod also rests upon the loop or bracket 17. The forward portions of the levers 14 and 34 are constructed substantially alike; but the shoulder 35 is farther away from the bale-chamber than the shoulder 15, and the parts are so arranged that the lug 22 will engage the shoulder 35 just after the shoulder 15 has been disengaged from said lug.

It will be observed that the lower ends of the fingers 24 are much lower down than the lower ends of the fingers 4 and also that their upper ends are curved outwardly from the bale-chamber. The sides of the chamber are slotted, as indicated by 37, to permit the fingers 24 to move inwardly toward each other, and the several parts are so arranged that pull by the rod 34 will cause the fingers 24 to move through an arc of about ninety degrees to the position shown in dotted lines in Fig. 4. As soon as the inclined portion 36 rides up on the loop 17 and releases the shoulder 35 from the lug 22 a spring 38, which engages a projection on the link 31, will return the parts to normal position.

As before stated, the fingers 4 will operate before the fingers 24 and both will operate during the last portion of the outward movement of the plunger, the lug 22 and loop 17 being so arranged that they will contact just as the outward movement of the plunger is completed. The fingers 4 gather the hay or straw which is in the hopper, fold it over, and press it partially through the feed-throat to the chamber, and as soon as these fingers are released the fingers 24 will be moved inwardly, still further fold the material, and will force the material down into the chamber, compress it in a vertical direction, and then move back to normal position just before the plunger begins its inward or compressing stroke.

It is of course necessary to provide some means for preventing the material passing into the bale-chamber behind the plunger, and for this purpose I provide a folding apron 39, made in two sections hinged together, one section being rigidly connected to the plunger and the other loosely connected to one end of a link 40, the other end of which is connected to the plate 2. The bale-chamber is provided with the usual side checks 41 and top check 42.

From the rear of the bale-chamber extends the usual contracting chamber 43. This is formed by four angle-bars 44, extending from and forming combinations of the four corners of the bale-chamber 1. These angle-bars are rigidly connected at one end to the chamber and their outer ends are connected to two bars 45, and the bars 45 are adjustably connected together at their upper and lower ends by spring tie-rods 46. The angle-bars on one side of the chamber may thus be moved toward or away from those on the other side. The top of the chamber 43 is preferably a solid plate 47, forming a continuation of the top of the bale-chamber. This plate lies loosely between the top angle-bars and is of less width than the top of the bale-chamber in order to permit the adjustment of the sides of the contracting chamber toward each other. The sides of the contracting chamber are preferably made of slats 48, connected at one end to the sides of the bale-chamber and at their other ends to the bars 45. The bottom will also consist of one or more slats 49, connected at one end to the bottom of the bale-chamber and loosely supported at their outer end on the bottom tie-rod 46.

I will now describe the mechanism for actuating the plunger. 50 indicates a reach rigidly connected at its rear end to the bale-chamber and pivotally connected at its forward end to the axle 51 and arch 52. The plunger-pitman 21 is provided at its outer end with a head 53, provided with spaced ears 54, between which a roller 55 is journaled. (See Fig. 10.) The head is also provided with two guide-rollers 56, mounted on a vertical axis, one of said rollers engaging one side of the reach and the other engaging one side of a bar 57, rigidly connected to the reach and extending above it. The head is also provided with a guide-roller 58, mounted on a horizontal axis and engaging a horizontal flange $57^a$ on bar 57. The pitman is thus guided in its reciprocating movements. 60 is an S-shaped double-faced cam journaled between the end of the reach 50 and the arch 52 and provided with a bar 61 on the upper end of its journal, to one end of which a draft-pole 62 is connected. A brace-rod 63 is connected to the other end of the bar 61 and to the other end of the draft-pole 62. A swingletree 64 is connected to the outer end of the pole 62 and a horse is intended to be hitched thereto and travel around in a circle in order to revolve the cam 60. The outer curved surfaces 65 of the cam are adapted to alternately engage the roller 55 in the head of the pitman, and thereby move the plunger rearwardly to compress twice in every revolution of the cam. In order to move the plunger forward, I provide a lever 66, pivoted at one end upon the reach 50, Figs. 7, 8, and 9, and a link 67 connects the other end of the lever to the pitman 21. Adjacent to its pivot the lever is provided with a lug 68, with which lugs 69 on frame 70 are adapted to engage, the frames being rigidly connected to the cams. The parts are so arranged that just as one curved surface 65 of the cam disengages the roller 55 one of the lugs 69 will engage lug 68, and as the cam continues its rotation the lever 66 will be moved from the position shown in Fig. 7 to that shown in Fig. 8, which results in moving the plunger forward. The lug 69 then moves out of engagement with lug 68, and the other curved face 65 of the cam is just engaged with the roller 55. It will be seen, therefore, that the pitman is reciprocated twice during each complete revolution of the cam.

Having described the invention, without limiting myself to the precise details of combination described, I claim—

1. In a baling-press, the combination with the bale-chamber, reciprocatory plunger and its pitman, of a hopper having rock-shafts journaled at opposite sides thereof, a series of fingers rigidly secured to said shafts and forming two sides of the hopper, a lug on the pitman, a rod having a lug to be engaged by that on the pitman to move the two series of fingers toward each other, lever-and-link connections between the rod and said shafts, and a spring for moving the two series of fingers away from each other substantially as and for the purpose specified.

2. In a baling-press, the combination of the bale-chamber, plunger and its pitman, of a hopper having two opposite sides formed of series of pivotally-supported fingers, a second series of pivotally-supported fingers on opposite sides of the bale-chamber below the first-named fingers, means operated by the pitman for moving the fingers of the first series toward each other, and means operated by the pitman for moving the fingers of the second series toward each other after the movement of the first.

3. The combination with the bale-chamber of a baling-press, of a feed-hopper communicating with the chamber, two series of fingers on opposite sides of the hopper above the feed-throat of the chamber, two series of fingers on opposite sides of the chamber below the feed-throat, means for first moving the upper series of fingers toward each other, and means for moving the lower series of fingers toward each other after the movement of the upper series.

4. In a baling-press, the combination with the bale-chamber, pitman and plunger, of a feed-hopper, rock-shafts supported on opposite sides of the hopper, series of fingers secured to said rock-shafts and forming two sides of the hopper, crank-arms on the shafts, a link connecting said crank-arms, a second crank-arm on one of the shafts, a lever pivoted between its ends, a link connecting the second crank-arm and one end of the lever, a rod connected to the other end of the lever, said rod having a shoulder, a lug on the pitman to engage said shoulder, means for disengaging the lug and shoulder after a predetermined movement of the pitman, and a spring for returning the fingers to normal position.

5. In a baling-press, the combination of the plunger, pitman, and a bale-chamber having slots in two opposite sides, a rock-shaft supported on each of said sides, fingers rigidly connected to said shafts opposite the slots, crank-arms on the shafts, a link connecting said arms, a second crank-arm on one of the shafts, a pivoted bell-crank lever, a link connecting said second crank-arm with one arm of the bell-crank lever, a rod connected to the other arm of the bell-crank lever and having a shoulder, a lug on the pitman to engage said shoulder, means for disengaging the lug and shoulder after a predetermined movement of the pitman, and a spring to return the fingers to normal position.

In testimony whereof I have signed my name to this specification in the presence of two subscribing witnesses.

FRANK A. LAKE.

Witnesses:
A. W. REED,
J. K. RITTER.